Oct. 4, 1966  E. E. BLAUROCK  3,276,114
METHOD OF MAKING SHAFT SEALS
Filed April 3, 1963  3 Sheets-Sheet 1

INVENTOR.
EDWARD E. BLAUROCK
BY
ATTORNEY

INVENTOR.
EDWARD E. BLAUROCK
BY Everett G. Wright
ATTORNEY

Oct. 4, 1966 E. E. BLAUROCK 3,276,114
METHOD OF MAKING SHAFT SEALS
Filed April 3, 1963 3 Sheets-Sheet 3
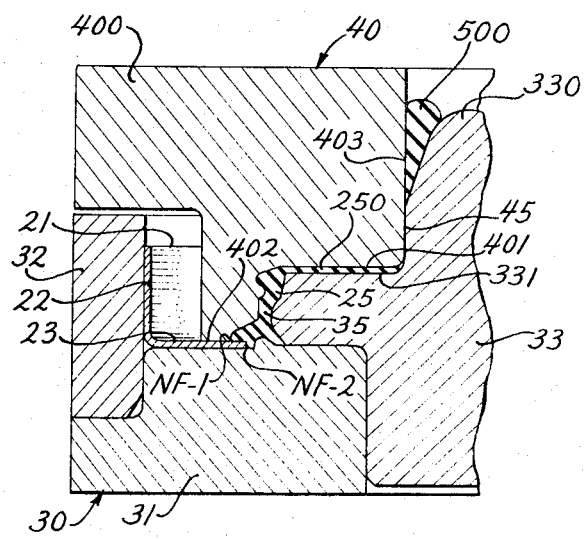
Fig. 10
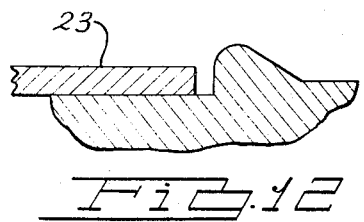
Fig. 11
Fig. 12
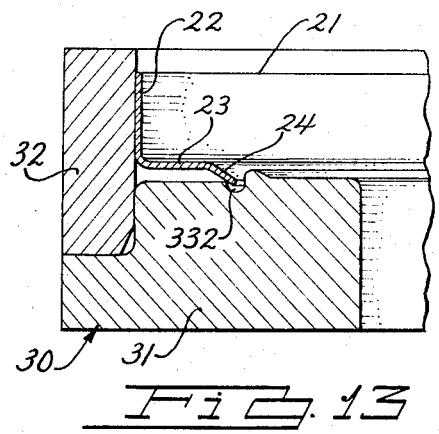
Fig. 13
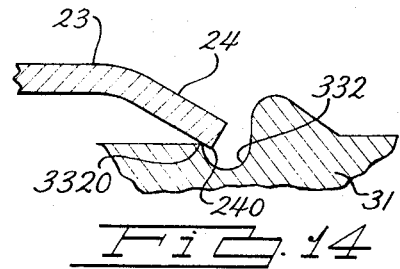
Fig. 14
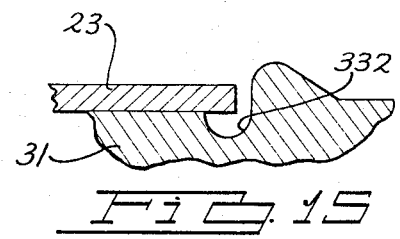
Fig. 15
INVENTOR.
EDWARD E. BLAUROCK
BY
ATTORNEY

3,276,114
METHOD OF MAKING SHAFT SEALS

Edward E. Blaurock, Ferndale, Mich., assignor to Michigan Precision Molded, Inc., Walled Lake, Mich., a corporation of Michigan
Filed Apr. 3, 1963, Ser. No. 270,257
1 Claim. (Cl. 29—527)

This invention relates to and has for its primary object an improved method of making shaft seals such as oil seals, dust seals or combined oil and dust seals composed of a metal ring or shell and a rubber or synthetic rubber sealing element, the said sealing element being molded to the shell in such a manner as to eleminate or accurately control flash to the extent that no flash trimming is required at the joinder of the sealing element with the shell.

A further object of the invention is to provide the method of flashless molding a rubber of a synthetic rubber shaft seal to the radially disposed flange of an annular metal shell in a die having a fixed and a movable element formed with the desired mold cavity therein comprising the forming of the radially disposed flange of said shell to provide a convex annular lip, placing the said shell in the molding die with the bottom of said annular lip thereof in a shell-to-die contact with said fixed die element, placing a charge of moldable rubber materal in said fixed die, bringing the movable element of said die in die-to-shell contact with said radial flange adjacent the said convex annular lip thereof during the closing of said die to form the rubber seal, and applying pressure during the closing of said die on the radially disposed flange of said shell sufficient to reform and straighten said annular lip thereof simultaneously with closing said die to accomplish the molding of the said shaft seal to the annular flange of said shell.

Other objects of the invention will become apparent by reference to the following detailed description taken in connection with the accompanying drawings, in which:

FIG. 10 is a view similar to FIG. 9 showing the movable die completely advanced with the dies completely closed; the radial flange of the shell having been completely reformed by the molding die during the closing of the molds.

FIG. 11 is a greatly enlarged fragmentary view showing the edge to die contact of the bottom of the convex lip of radial shell flange to the fixed die of FIGS. 6, 7, 8 and 9.

FIG. 12 is a view similar to FIG. 11 except that the lip of the radial shell flange has been reformed.

FIG. 13 is a view similar to FIG. 6 showing the fixed molding die element with a suitable annular groove therein to provide an annular circular bearing on the fixed die for the bottom of the convex annular lip of the radial shell flange as it is reformed during the molding operation.

FIG. 14 is a greatly enlarged fragmentary view showing the bottom to die contact of the bottom of the convex lip of the radial shell flange to the fixed die of FIG. 13.

FIG. 15 is a view similar to FIG. 14 showing the convex lip of the radial flange straightened by the molding operation.

Figure 1:
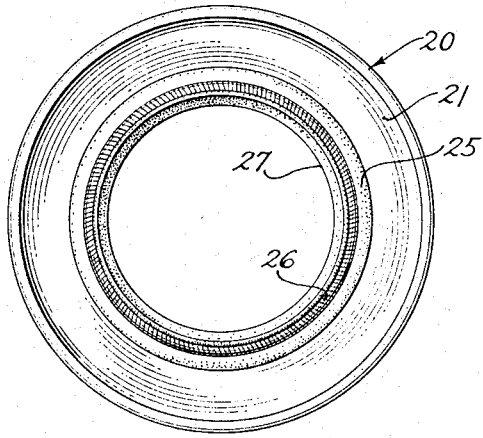
FIG. 1 is a top plan view of a typical shaft seal molded according to the method of the invention.
Figure 2:
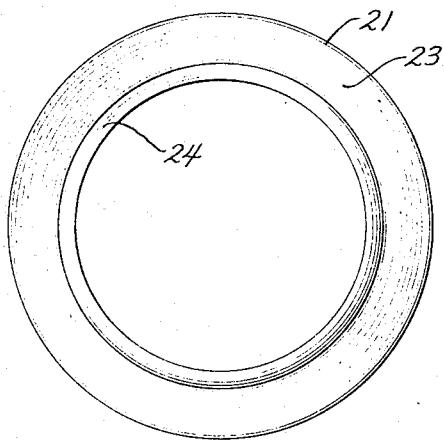
FIG. 2 is a bottom view of the annular shell of the shaft seal with the radial flange thereof preformed prior to molding the sealing element thereto.

Referring now to the drawings wherein like reference characters refer to like and corresponding parts throughout the several views, the invention is herein disclosed and illustrated in connection with a shaft seal 20 which may be considered typical of the type of shaft seal that may be produced in accordance with the invention without flash or essentially without flash at the junction of the molded sealing element to the metal shell thereof.

Figure 3:
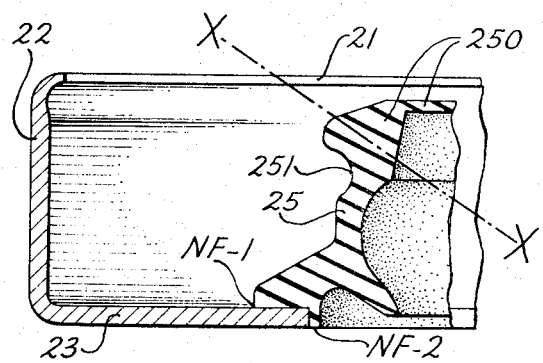
FIG. 3 is an enlarged fragmentary sectional view showing the shaft seal as molded.
Figure 4:
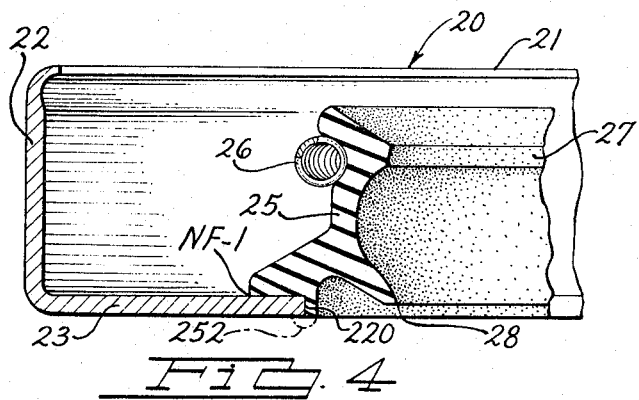
FIG. 4 is an enlarged fragmentary sectional view showing the completed shaft seal.

The shaft seal 20 in connection with which the invention is illustrated is composed of an annular shell 21 having an axially disposed flange 22 and a radially disposed flange 23. A rubber or synthetic rubber sealing element 25 is molded to the radially disposed flange 23 as shown in FIG. 3. As molded, the said sealing element 25 has a surplus central portion 250 which is trimmed annularly at X—X to provide the final form thereof as illustrated in FIG. 4 around which is placed a garter type spring 26. The completed seal 20 is best illustrated in FIG. 4 as a combined oil and dust seal which has an annular oil seal lip 27 backed up by the said garter spring 26 and an annular dust seal lip 28.

Figure 5:
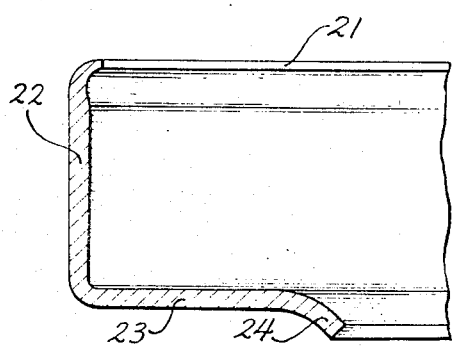
FIG. 5 is an enlarged fragmentary sectional view of the annular shaft seal shell after the preforming the radial flange thereof with a convex annular lip at its inner periphery.

Obviously, the said sealing element 25 may be of any selected design to provide either single or multiple sealing lips for contact between stationary and rotating elements either with or without garter or other type pressure springs. Also, the shell 21 may be of any shape or design which provides a suitable radially disposed flange 23 to which a sealing element 21 may be molded by the flashless molding method of the invention. The axially disposed flange 22 of the shell 21 may be curled at its outer edge as shown in FIGS. 4 and 5, or it may be straight as shown in FIGS. 6-10 inclusive. It will be understood that the shell may be formed of any suitable metal, and that the sealing element may be molded out of rubber or synthetic rubber or any other suitable moldable material.

In the illustrative embodiment of the invention, prior to molding the sealing element 25 to the annular shell 21 to produce the shaft seal 20, the radially disposed flange 23 of the shell 21 is formed with a convex annular lip 24 as best shown in FIG. 5. The molding die preferably employed consists of a fixed die element 30 and a movable die element 40. The fixed die element 30 consists of a lower annular base element 31, an outer annular shell centering ring 32, and a central circular die element 33. The movable upper die element 40 is annular in form and telescopes neatly over a central guide stem 330 extending upwardly from the central circular element 33 of the fixed die 30.

The said central circular element 33 of the fixed die 30 is provided with an annular shelf 331 which received an annular charge of moldable rubber or synthetic rubber or other moldable material 50 as shown in FIG. 5. The lower annular base element 31 and the center circular die element 33 of the fixed die 30 as well as the depending annular portion 400 of the movable upper die element 40 are formed to the desired contours to provide a mold cavity 35 to produce the desired finished form of the sealing element 25 when the molding dies 30 and 40 are closed. The upper movable die 40 is provided with a flat annular press portion 401 which contacts the annular charge of moldable material 50 and forces the same under pressure to fill the die cavity 60 as hereinafter described; however, when the molding dies 30 and 40 are closed, the flat annular press portion 401 of the movable die 40 does not quite contact the shelf 330 of the central circular element 33 of the fixed die 30, see FIG. 10. The bottom of the upper movable annular die 40 is formed into a preferably flat annular pressure ring 402 which applies pressure to the top of the axially disposed flange 22 of the annular shell 21 to straighten the same during the closure of the molding dies 30 and 40, and to eliminate flash at NF–1.

Figure 6:
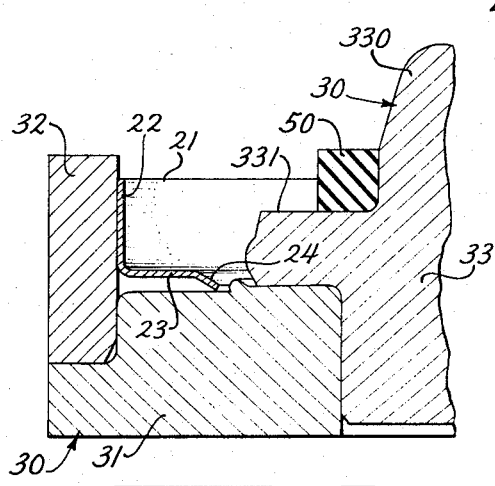
FIG. 6 is a more or less diagrammatic sectional view of a fixed molding die with the preformed shaft seal shell therein indicating a preferred placement in the mold of a charge of moldable rubber or synthetic rubber compound.

Referring now to FIGS. 6–10 inclusive, after the axially disposed flange 22 of the annular shell 21 is formed with its convex annular lip 24, the said annular shell 21 is placed centrally in the fixed die 30 with the axial flange 22 thereof disposed within the centering ring 32 and with the lower annular edge 240 of the said annular lip 24 in contact with the annular base element 32. An annular charge of moldable material 50 sufficient to accomplish the molding of the sealing element 25 is placed on the annular shelf 331 of the central circular element 33 of the fixed die 30. The fixed die 30 is now loaded ready for molding as shown in FIG. 6.

Figure 8:
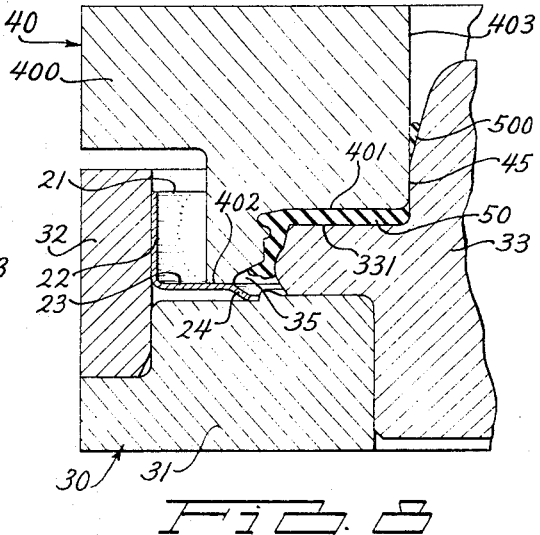
FIG. 8 is a view similar to FIG. 7 showing the movable die advanced into contact with the top of the radial flange of the shell.
Figure 7:
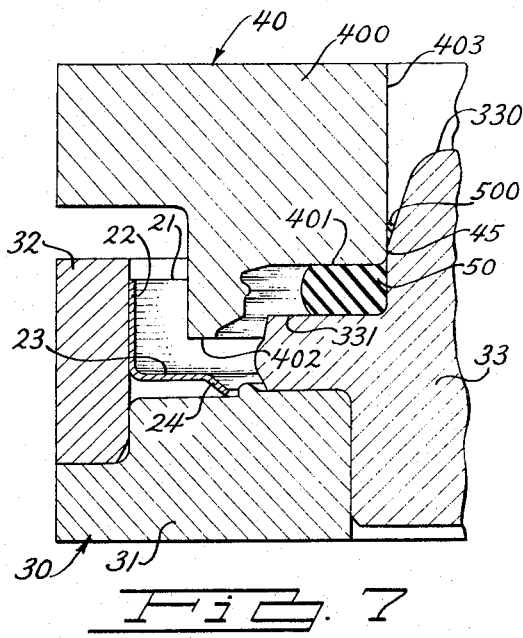
FIG. 7 is a view similiar to FIG. 6 showing the beginning of the closing stroke of the movable molding die.

Thre movable die element 40 is then brought downwardly as viewed in FIG. 7 whereupon the flat annular press portion 401 thereof squeezes the annular charge of moldable material 50 between itself and the annular shelf 331 of the fixed die element 30. As the movable die element 40 continues to move downwardly to the position thereof as shown in FIG. 8, the moldable material 50 flows partially filling the mold cavity 35 therewith, and the flat annular pressure ring 402 of the depending annular portion 400 of the movable die 40 firmly contacts and bears against the top of the axially disposed flange 22 of the shell 21 providing a positive seal therebetween. It is important that this occurs before the mold cavity 35 is completely filled with moldable material 50 to prevent the forming of flash at NF as best indicated in FIGS. 3 and 8.

Figure 9:
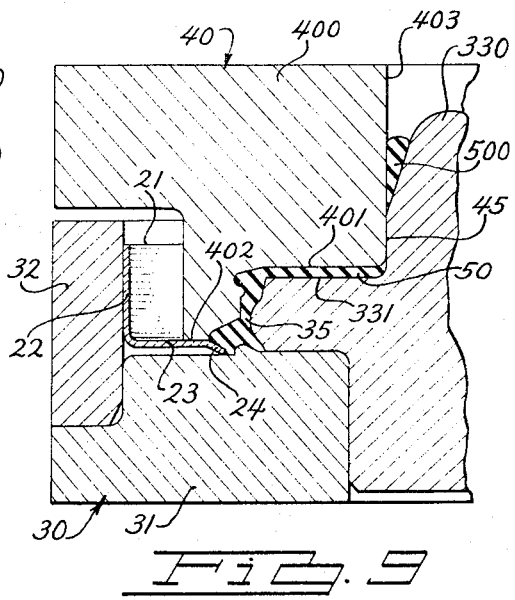
FIG. 9 is a view similar to FIG. 8 showing the movable die further advanced and reforming the radial flange of the shell.

As the movable die element 40 continues to move toward the die closed position as shown in FIG. 9, the mold cavity 35 is completely filled with moldable material 50, the annular pressure ring 402 bearing on the annular radial flange 22 of the shell 21 starts to flatten the convex annular lip 24 thereof. This applies extremely high pressure between the lower annular edge 240 of the said annular lip 24 and the lower annular base element 32 of the fixed die 30, see FIG. 11, thus providing a positive seal therebetween to prevent forming of flash at NF–2 as best shown in FIGS. 3 and 10. Because of a slight clearance at 45 between the central guide stem 330 of the fixed die 30 and the inner annulus 403 of the movable die 40, surplus 500 of moldable material 50 is forced from the die cavity through the said clearance 45, see FIGS. 7–10 inclusive.

FIG. 10 shows the dies 30 and 40 completely closed at which time the annular pressure ring 402, for all practical purposes, has completely reformed the annular radial flange 20 of the shell 21 as best shown in FIG. 12, and at the same time a positive seal has been maintained at NF–1 and NF–2 to prevent the forming of flash thereat either completely or for all practical purposes to the extent that no trimming is required at this point. After the dies 30 and 40 are closed under the required pressure, the usual heat curing of the sealing element 25 under said required pressure takes place, and then the dies are opened and the molded shaft seal 20 is removed therefrom. At the time of the removal of the shaft seal 20 from the molding dies 30 and 40, it includes an upper central portion 250 formed by surplus moldable material 50 remaining between the press portion 401 of the movable die and the annular shelf 331 of the fixed die 30, see FIG. 3.

Because of the flashless or substantially flashless molding of the sealing element 25 to the annular shell 21 according to the method of the invention, no flash trimming of the shaft seal 20 is required. However, the final desired form of the finished sealing element 25 as shown in FIG. 4 is produced by cutting the molded form thereof along the line X—X as shown in FIG. 3. Of course, the garter spring 26, if used, is placed around the sealing element 25 at a suitable groove 251 molded in the outer periphery thereof.

By reference to FIGS. 13, 14 and 15, it will be observed that, in practicing the invention, the lower annular base element 31 of the fixed die 30 may be provided with a suitable annular groove 332 therein to provide an annular circular bearing under the bottom of the convex annular lip 24 formed on the radial shell flange 23 prior to molding the sealing element thereto, the said annular groove 332 being so located that the bottom of the convex annular lip 24 of the radial shell flange 23 adjacent its annular edge 240 is in pressure contact during molding with the base element 31 of the fixed die 30 at the edge 3320 of the said annular groove 332 therein as best shown in FIG. 14, except, after the said convex annular lip 24 of the radial shell flange 23 has been reformed upon the complete closing of the fixed and movable dies 30 and 40, the reformed radial shell flange 23 lies flat upon the base element 31 of the fixed die 40 as best shown in FIG. 15. Obviously, the foregoing die modification may be employed when it is desirable to encompass the inner peripheral edge 220 of the axially disposed flange 22 of the annular shell 21 by a bead 252 on the sealing element 25 as indicated by the dot and dash lines 252 in FIG. 4.

Although but a single embodiment and one modification of the method of making shaft seals has been disclosed herein in connection with the production and molding of a typical type of shaft seal with which the invention may be employed, it is obvious that many detailed changes may be made in the method steps employed in using the invention with other seals than the one shown to illustrate the invention, all without departing from the spirit and scope thereof as defined by the appended claim.

I claim:

The method of making shaft seals of the type having an annular metal shell consisting of an axially disposed flange and a radially disposed flange to which a rubber or synthetic rubber sealing element is molded in a die having a fixed and a movable die element formed to provide a die cavity when said die is closed for molding said sealing element to the radially disposed flange of said shell comprising the steps of forming a convex annular lip on the radially disposed flange of said shell, placing said shell in the fixed die element with only the bottom corner of said annular lip being initially in contact with said fixed die element, placing a prepared charge of moldable rubber material in said die, closing said die under molding pressure while applying direct die-to-shell pressure by said movable die element on said radially disposed flange of said shell adjacent said convex annular lip thereof thereby reforming the same into the original plane of the said radially disposed flange during said closing of said die, the reforming of said convex annular lip of the radially disposed flange of said shell applying continuous shell-to-die sealing pressure between said annular corner of said convex annular lip and said fixed die, and then curing said moldable material in its molded state in said closed die bonding the same to said shell, all providing flashless molding of said sealing element to the radially disposed flange of said shell.

References Cited by the Examiner
UNITED STATES PATENTS 3,004,298  10/1961  Haynie _____ 264—276
3,090,996  5/1963  Reichenbach et al. ____ 29—527

JOHN F. CAMPBELL, *Primary Examiner.*

WHITMORE A. WILTZ, *Examiner.*

P. M. COHEN, *Assistant Examiner.*